(12) United States Patent
Cordeiro (10) Patent No.: US 9,467,217 B2
(45) Date of Patent: Oct. 11, 2016

(54) NATIVE MEDIUM ACCESS CONTROL SUPPORT FOR BEAMFORMING

(75) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/494,014

(22) Filed: Jun. 11, 2012

(65) Prior Publication Data

US 2012/0250670 A1    Oct. 4, 2012

Related U.S. Application Data

(62) Division of application No. 12/646,965, filed on Dec. 23, 2009.

(51) Int. Cl.
| | | |
|---|---|---|
| H04W 4/00 | (2009.01) | |
| H04B 7/06 | (2006.01) | |
| H04B 7/04 | (2006.01) | |
| H04L 1/16 | (2006.01) | |

(52) U.S. Cl.
CPC .......... H04B 7/0617 (2013.01); H04B 7/0491 (2013.01); H04L 1/1607 (2013.01)

(58) Field of Classification Search
CPC .. H04B 7/0491; H04B 7/0617; H04L 1/1607
USPC ....................................................... 370/334
See application file for complete search history.

(56) References Cited

U.S. PATENT DOCUMENTS

| 7,359,706 B2 | 4/2008 | Zhao |
|---|---|---|
| 8,311,160 B1 | 11/2012 | Zhang |
| 2003/0040331 A1 | 2/2003 | Zhao |

(Continued)

FOREIGN PATENT DOCUMENTS

| CN | 1388719 A | 1/2003 |
|---|---|---|
| CN | 1434991 A | 8/2003 |

(Continued)

OTHER PUBLICATIONS

Veen, Barry D., et al., "Beamforming a Versatile Approach to Spatial Filtering", IEEE ASSP Magazine, vol. 5, Issue 2, Apr. 1988, pp. 4-24.

(Continued)

*Primary Examiner* — Ayaz Sheikh
*Assistant Examiner* — Hai-Chang Hsiung
(74) *Attorney, Agent, or Firm* — Schubert Law Group PLLC (57) ABSTRACT

Apparatuses, systems, and methods that enable native MAC support of beamforming are contemplated. An embodiment may comprise a mobile computing device, such as a laptop, with wireless communications capabilities, such as an integrated wireless networking card. The networking card of the laptop may transmit and receive various types of frame data using one or more beamforming techniques. Upon establishing a link with another wireless device, the laptop may sense that the link quality is degrading. Instead of having to reestablish a new link using dedicated BF frames and the conventional BF protocol, embodiments described herein may instead transmit beamforming information in various types of frames which enable the wireless communication devices to adjust the beamforming parameters in a more efficient manner. For example, the devices may include beamforming information in control frames and data frames and transmit the frames in a sweeping sector fashion.

16 Claims, 7 Drawing Sheets

(56) References Cited

U.S. PATENT DOCUMENTS

| | | |
|---|---|---|
| 2006/0281494 A1 | 12/2006 | Wilson et al. |
| 2006/0291544 A1 | 12/2006 | Fischer et al. |
| 2007/0264941 A1 | 11/2007 | Trainin |
| 2007/0281737 A1 | 12/2007 | Zhao |
| 2008/0002733 A1 | 1/2008 | Sutskover |
| 2008/0004076 A1 | 1/2008 | Adachi et al. |
| 2008/0049744 A1 | 2/2008 | Kim et al. |
| 2008/0225768 A1* | 9/2008 | Wentink .................. 370/311 |
| 2009/0046010 A1 | 2/2009 | Niu et al. |
| 2009/0046012 A1 | 2/2009 | Niu et al. |
| 2009/0160707 A1* | 6/2009 | Lakkis .................... 342/367 |
| 2010/0054213 A1* | 3/2010 | Trainin ................... 370/336 |
| 2010/0157955 A1* | 6/2010 | Liu et al. ................. 370/336 |
| 2010/0214169 A1* | 8/2010 | Kafle ...................... 342/368 |
| 2011/0069688 A1* | 3/2011 | Zhang ............ H04L 1/0083 370/338 |
| 2011/0149842 A1 | 6/2011 | Cordeiro |

FOREIGN PATENT DOCUMENTS

| | | |
|---|---|---|
| CN | 1906893 A | 1/2007 |
| CN | 101243699 A | 8/2008 |
| CN | 101359946 A | 2/2009 |
| CN | 101548488 A | 9/2009 |
| CN | 101601317 A | 12/2009 |
| CN | 102326338 A | 1/2012 |
| EP | 1261222 A1 | 11/2002 |
| FR | 2861231 A1 | 4/2005 |
| JP | 2003-249982 A | 9/2003 |
| JP | 2004-297750 A | 10/2004 |
| JP | 2007-509523 A | 4/2007 |
| JP | 2008-109622 A | 5/2008 |
| JP | 2009-212560 A | 9/2009 |
| RU | 2292671 C2 | 1/2007 |
| WO | 01/17131 A1 | 3/2001 |
| WO | 02/052677 A1 | 7/2002 |
| WO | 03/019835 A1 | 3/2003 |
| WO | 2008/069245 A1 | 6/2008 |
| WO | 2009/137092 A1 | 11/2009 |
| WO | 2010/095061 A1 | 8/2010 |
| WO | 2001017131 A1 | 3/2011 |
| WO | 2011/087612 A3 | 7/2011 |
| WO | 2011087612 A2 | 7/2011 |
| WO | 2011087612 A3 | 11/2011 |

OTHER PUBLICATIONS

Singh, Harkirat et al., "A MAC protocol based on Adaptive Beamforming of Ad Hoc Networks", 14th IEEE Proceedings on Personal, Indoor and Mobile Radio Communications, PIMRC 2003, vol. 2, Sep. 7, 2003, pp. 5 pages.

International Search Report and Written opinion received for PCT Patent Application No. PCT/US2010/058793, Mailed on Sep. 27, 2011, 9 pages.

Office Action Received for European Patent Application No. 10843446.5, Mailed on Jul. 31, 2012, 2 pages.

International Preliminary Report and Written opinion received for PCT Patent Application No. PCT/US2010/058793, mailed on Jul. 5, 2012, 6 pages.

Lianye et al., "Wireless Network and Application Technology Thereof", Jun. 30, 2004, pp. 1-25.

Notice of Allowance received for Chinese Patent Application No. 2010106201203, mailed on Nov. 15, 2014, 2 Pages of Notice of Allowance and 2 Pages of English Translation.

Office Action received for Chinese Patent Application No. 201010620120.3, mailed on Mar. 7, 2014, 12 Pages of Office Action and 14 Pages of English Translation.

Office Action received for Chinese Patent Application No. 201010620120.3, mailed on Apr. 12, 2013, 7 Pages of Office Action and 11 Pages of English Translation.

Office Action received for Japanese Patent Application No. 2012-539090, mailed on Jul. 16, 2013, 2 Pages of Office Action and 2 Pages of English Translation.

Office Action received for Japanese Patent Application No. 2012-539090, mailed on Apr. 30, 2014, 2 Pages of Office Action and 2 Pages of English Translation.

Office Action received for Russia Patent Application No. 2012126117, mailed on Nov. 24, 2014, 7 Pages of English Translation and 8 Pages of Russia Office Action.

Notice of Allowance received for Japanese Patent Application No. 2012-539090, mailed on Sep. 24, 2014, 3 Pages of Notice of Allowance and 5 Pages of English Translation of the allowed claims.

Notice of Allowance received for Russia Patent Application No. 2012126117, mailed on Apr. 27, 2015, 7 Pages of English Translation and 12 Pages of Notice of Allowance.

\* cited by examiner

NATIVE MEDIUM ACCESS CONTROL SUPPORT FOR BEAMFORMING

FIELD

The embodiments herein are in the field of communications. More particularly, the embodiments relate to methods, apparatuses, and systems that enable medium access control (MAC) support for beamforming activities.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

The following is a detailed description of embodiments depicted in the accompanying drawings. The specification is in such detail as to clearly communicate the embodiments. However, the amount of detail offered is not intended to limit the anticipated variations of embodiments. To the contrary, the intention is to cover all modifications, equivalents, and alternatives consistent with the spirit and scope of the embodiments as defined by the appended claims.

Electronic devices like personal computers, cellular telephones, personal digital assistants (PDAs) may employ Wireless Personal Area Network (WPAN) and Wireless Local Area Network (WLAN) standards in order to communicate with one another and with peripheral devices. Numerous standards define how WPANs and WLANs may be structured and operate. Example standards are the Bluetooth® (BT) 1.2, the Wireless Gigabit Alliance specifications, the Institute of Electrical and Electronic Engineers (IEEE) Std 802.15.3 and the IEEE 802.11 standards.

The following specification employs the term beamforming (BF) throughout. Beamforming may generally be interpreted as a technique of using several antenna elements to spatially shape emitted electromagnetic waves transmitted from a wireless communication device. The communication device may employ any one of a variety of different methods to focus, concentrate, or "beam" the energy into a receiving device. The communication device may focus the transmitted energy by, for example, adjusting or manipulating the magnitude and phase of the transmitted signals from individual antenna elements of an antenna array. Similarly, the receiving device may also manipulate one or more different antenna elements of an antenna array to concentrate the received signal. Such beamforming activities may require the transmitting and receiving devices to perform channel sounding to optimize the shape and direction of the beam.

Generally speaking, methods, apparatuses, and systems that enable native MAC support of beamforming are contemplated. A system embodiment may be a mobile computing device, such as a laptop, with wireless communications capabilities, such as an integrated wireless networking card. The networking card of the laptop may transmit and receive various types of frame data using one or more beamforming techniques.

Upon establishing a link with another wireless communication device, and adjusting one or more parameters of the link using beamforming techniques, the laptop may sense that the link quality is degrading. Instead of having to reestablish a new link using dedicated BF frames and the conventional BF protocol, embodiments described herein may instead transmit beamforming information in various types of frames which enable the wireless communication devices to adjust the beamforming parameters in a more efficient manner. For example, the devices may include beamforming information in control frames and data frames and transmit the frames in a sweeping sector fashion. The receiving device may recognize that the transmitting device is requesting a change of one or more of the beamforming values and respond accordingly.

A method embodiment may involve a first wireless communication device, such as a station, determining a countdown value related to a number of frames to be transmitted from a plurality of antennas. By transmitting numerous frames, such as by transmitting numerous control frames or numerous data frames in a sector sweeping fashion, the station may enable adjustment of one or more beamforming parameters or values. The beamforming parameters may be for a first station and/or for a second station of a wireless network. In transmitting the numerous frames, the first station may assemble numerous values for a beamforming field of a frame. The values may be related to the adjustment and include the countdown value. The first station may transmit the frame from the first station, including the numerous values of the beamforming field.

An embodiment of an apparatus may comprise a transmitter, an antenna array, and a frame generation module. The antenna array may be configured to selectively transmit control frames in sectors about the apparatus. The frame generation module may be communicatively coupled to the transmitter and generate the control frames. The control frames may have a beamforming field with beamforming values. The beamforming values may enable the apparatus to perform beamforming activities.

Another apparatus embodiment may comprise antenna elements configured to transmit data, via beamforming, to a plurality of sectors about the apparatus. The apparatus includes a beamforming module coupled to the plurality of antenna elements. The beamforming module may manipulate one or more of the antenna elements in a manner which selectively transmits data to individual sectors. A frame generation module of the apparatus may generate data frames, management frames, and control frames. Such frames may form the data to be transmitted. In the frames, the frame generation module may be configured to include a beamforming field in a plurality of the frames.

An alternative system embodiment may comprise an antenna array, a beamforming module, a transmitter, a receiver, and a processor. The beamforming module may be coupled to the antenna array and manipulate the antenna array to transmit frames to a plurality of sectors about the system. The beamforming module may also manipulate the antenna array to transmit frames to a single sector of the plurality. The processor may be coupled to the receiver and the transmitter. The processor may receive frames transmitted to at least one antenna of the antenna array, or send the frames to the transmitter for transmission. The processor includes a frame generation module which generates the frames. The frame generation module inserts beamforming values in fields of the frames. The beamforming values enable a device which receives the frames to perform training activities related to beamforming.

Various embodiments disclosed herein may be used in a variety of applications. Some embodiments may be used in conjunction with various devices and systems, for example, a transmitter, a receiver, a transceiver, a transmitter-receiver, a wireless communication station, a wireless communication device, a wireless Access Point (AP), a central point (PCP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3 GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA), Multi-Carrier Modulation (MDM), Discrete Multi-Tone (DMT), Bluetooth (RTM), ZigBee (TM), or the like. Embodiments may be used in various other apparatuses, devices, systems and/or networks.

Figure 1A:
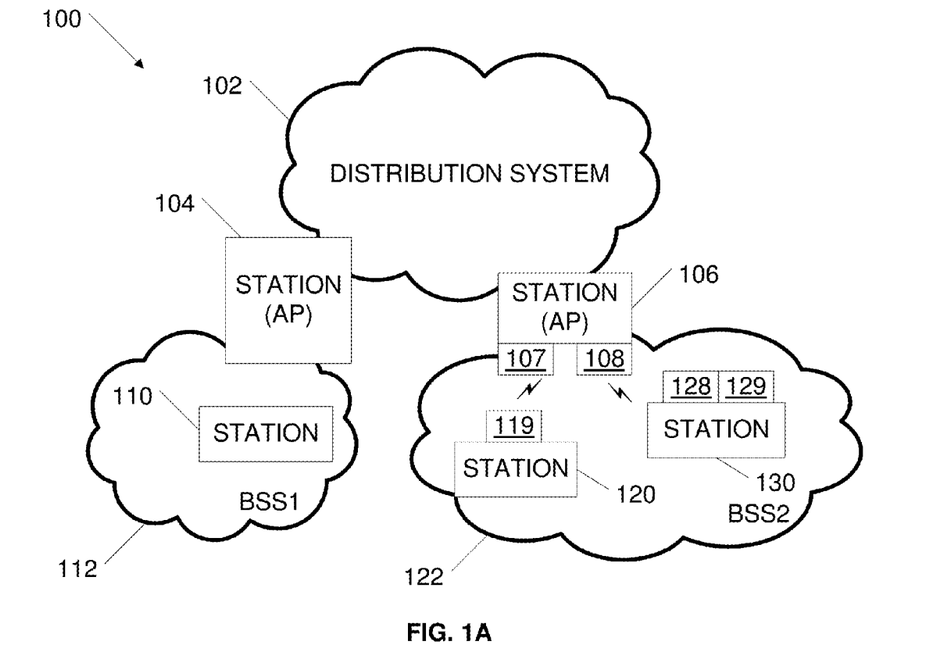
FIG. 1A depicts an embodiment of a wireless local area network (WLAN) which may enable native MAC support for beamforming activities.

Turning now to the drawings, FIG. 1A depicts an embodiment of a wireless local area network (WLAN 100) which may enable native MAC support for beamforming activities in various types of communication devices. For example, one or more stations of WLAN 100 may communicate via the 60 gigahertz (GHz) band and employ one or more beamforming technologies. It should be appreciated that various types of local area networks for transmitting data to and receiving data from network stations using beamforming technologies may be employed in the various exemplary embodiments. For example, in an alternative embodiment, the WLAN may instead comprise an IEEE 802.11 network, a wireless personal area network (WPAN), a general packet radio service (GPRS) network, a global system for mobile communication (GSM) network, a code division multiple access (CDMA) network, a Bluetooth® network, or other suitable wireless network.

As shown in FIG. 1A, the WLAN 100 includes a distribution system 102, stations 104 and 110 provided in a first basic service set (BSS) 112 having the same basic service, and stations 106, 120, and 1300 provided in a second basic service set BSS 122 having the same basic service. For example, stations 110 and 104 may comprise network stations provided within a cell under a common coordinating function, with one of the stations providing access to the distribution system 102 being an access point (AP) to a basic service set. Similarly, stations 106, 120, and 130 may comprise network stations provided within a cell under a common coordinating function, with one of the stations providing access to the distribution system 102 being an access point (AP) to a second basic service set. Stations 104, 110, 106, 120, and 130 together with the distribution system 102 may form an extended service set (ESS), where all stations may communicate with each other without involving entities outside of the 802.11 MAC architecture. It should be appreciated that any of the stations of WLAN 100 that are not access points may comprise mobile stations.

Further, it should be appreciated that the stations 104, 110, 106, 120, and 130 may be connected to other devices and/or networks with which the stations may communicate. For example, BSS 112 and/or BSS 122 may comprise peripheral devices and additional networking devices in alternative embodiments. Furthermore, though FIG. 1A only shows five stations within WLAN 100, it should be appreciated that an alternative embodiment may include more than five stations. That is, it should be appreciated that BSS 112 or BSS 122 may each include more stations in alternative embodiments. As will be illustrated, one or more of the stations in BSS 122 may enable native MAC support for beamforming and beamtracking to improve the performance of WLAN 100.

As shown in FIG. 1A, stations 104 and 106 are also access points (AP) that provide access to the distribution system 102 by the basic service sets, BSS 112 and BSS 122, respectively. The distribution system 102 enables mobile network station support to the mobile network stations 110 and 120 by providing the logical services necessary to handle address to destination mapping and seamless integration of multiple basic service sets. Data may move between the basic service sets, BSS 112 and BSS 122, and the distribution system 102 via the access points. In accordance with these embodiments, because the access points are also stations (104 and 106), they are addressable entities. It should be appreciated that though FIG. 1A shows basic service sets BSS 112 and BSS 122 as two separate sets, in accordance with various exemplary embodiments, the basic service sets may partially overlap, be physically disjointed, or be physically collocated.

Station 106 may utilize antenna array 107 to communicate within one or more stations, such as station 120 or station 130, via one or more antenna sectors. For example, station 106 may utilize antenna array 107 to communicate with station 120 via antenna array 119, or communicate with station 130 via antenna array 129. One of the stations, such as station 106, may act as a network coordinator (such as a Personal BSS Central Point, or PCP) to coordinate communications among stations 106, 120, and 130 and control access to the wireless medium. When acting as the network coordinator, station 106 may broadcast a beacon frame that indicates the length of a beacon interval during which communications are to take place. The beacon frame may be received by the various stations of BSS 122, thereby informing the stations as to when the next beacon interval will occur. In some embodiments, the next beacon interval may be identified by a beacon transmission.

Various stations of BSS 122 may support one or more beamforming (BF) technologies that transmit of focus energy in a variety of different directions, or sectors. BF allows a pair of stations to achieve a desirable link budget for subsequent communication. For example, station 106 and station 120 may employ beamforming via antenna arrays to establish and tune the communication link between the two stations. To illustrate the concept of beamforming in more detail, and prepare for describing how an embodiment may enable native MAC support for beamforming, we briefly turn to FIGS. 2A and 2B.

Figure 2A:
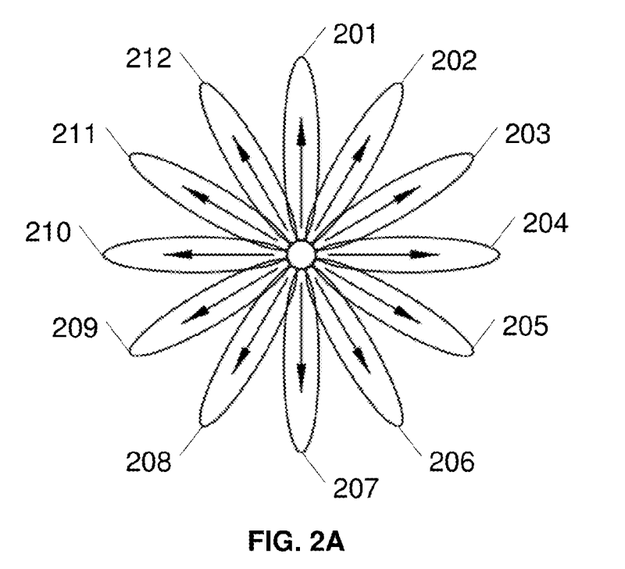
FIG. 2A illustrates a plurality of antenna sectors provided by an antenna array of a station.

FIG. 2A illustrates a plurality of antenna sectors, 201-212, provided by an antenna array of a station, in accordance with some embodiments. For example, antenna array 107 may be configured to selectively transmit a signal in one of the antenna sectors. In other words, antenna array 107 may focus or direct the transmitted energy during a transmission in one direction, such as in the direction of antenna sector 203, and then manipulate an antenna element to cause the transmitted energy to be focused or directed in a different direction, such as in the direction of antenna sector 204.

Although FIG. 2A shows only twelve antenna sectors (201-212) for a single embodiment, alternative embodiments may support beamforming with a lesser or greater number of antenna sectors. For example, in some embodiments the antenna array may be able to focus the transmission energy in 24 different sectors, in 48 sectors, or even more antenna sectors.

Figure 2B:
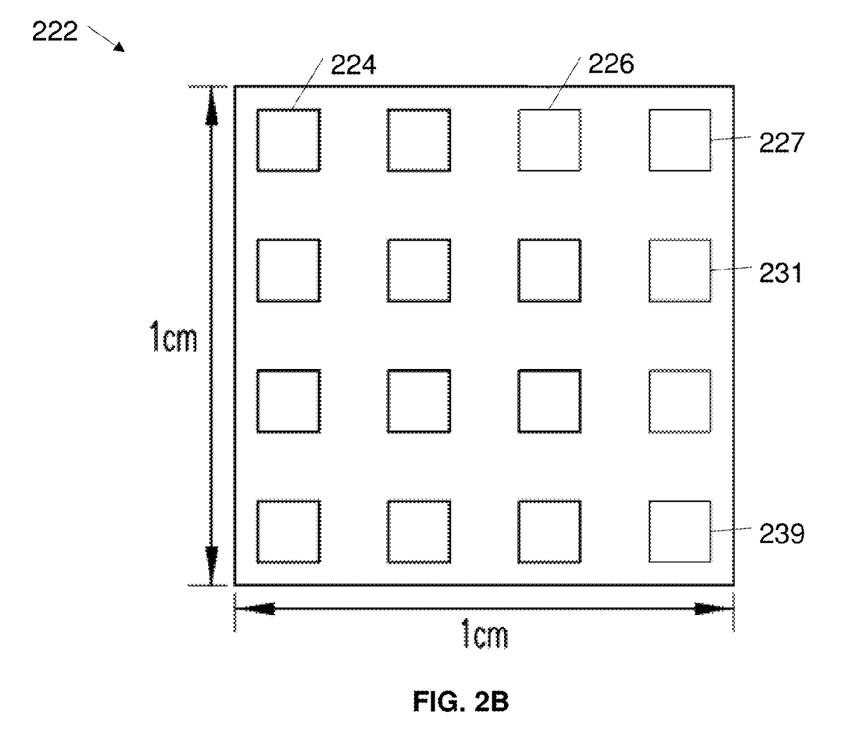
FIG. 2B illustrates a portion of an antenna array.

FIG. 2B illustrates a portion 222 of an antenna array, in accordance with some embodiments. In these embodiments, portion 222 may be a portion of an antenna array, such as antenna array 107 for station 106, antenna array 119 for station 120, or antenna array 129 of station 130. Portion 222 may comprise a plurality of antenna elements (224-239) configured to transmit and receive millimeter-wave signals within antenna sectors 201-212 of FIG. 2A utilizing one or more beamforming techniques. The plurality of antenna elements 224-239 may provide a higher gain and allow the beam width and the beam direction of the transmitted energy to be controlled by signal processing techniques either in the analog or the digital domain. In these embodiments, the antenna arrays may operate as a phased array with a predetermined spacing between the antenna elements 224-239.

In some embodiments, station 106, 120, or 130 may utilize one or more antenna arrays which may be configured to selectively transmit in each antenna sector of antenna sectors 201-212. The number of antenna elements used to selectively transmit data in one or more of the sectors may differ based on the direction and the embodiment. For example, in some embodiments, at least two antenna elements may be used per each antenna sector. Other embodiments may employ four or more antenna elements to transmit in each of the antenna sectors.

While portion 222 is depicted as being within a 1 centimeter (cm) square, alternative embodiments may employ antenna arrays having different shapes and different dimensions. For example, one alternative embodiment of station 120 may employ four antenna arrays 119, with one antenna array on each side of station 120. In the alternative embodiment, each of the antenna arrays 119 may comprise nine antenna elements generally arranged in the shape of a circle and configured to transmit data in a plurality of sectors, such as five different sectors each, from the respective side of station 120 associated with the specific antenna array. Further, in an alternative embodiment, station 120 may use one antenna array 119 to communicate with station 106, yet use another antenna array 119 located on a different side of station 120 to communicate with station 130.

Turning back to FIG. 1A, one or more of stations 106, 120, and 130 may provide legacy support for beamforming. The stations may provide legacy support by generally using a specific standard, e.g. the Institute of Electrical and Electronics Engineers (IEEE) standard 802.15.3c. In other words, one or more of stations 106, 120, and 130 may conform to standards adopted by such alliances, organizations, or groups as the Wireless Gigabit Alliance (a.k.a. WiGig or WGA), WirelessHD®, European Computer Manufacturers Association (ECMA), perform BF through the transmission of dedicated BF frames used by the BF protocol.

When providing legacy support for beamforming, a station of BSS 122 may act as an initiating station to initiate BFT with other stations in BSS 122. For example, station 106 may act as an initiating station to initiate BFT with station 120 and/or station 130. When station 106 is the initiator, station 120 or 130 may be referred to as a responding station, or responder. The initiating station 106 may announce a number of sector-sweep (SS) slots of a BFT period and generate a number of SS frames within each SS slot. Initiating station 106 may receive one or more SS frames from one or more of the responding stations within one or more of the SS slots of the BFT period. Further, station 106 and may transmit one or more SS feedback frames to the responding stations to indicate a desired or preferred antenna configuration that the responding station (s) should use when communication with station 106. The indicated antenna configuration may refer to a particular antenna sector.

Figure 3:
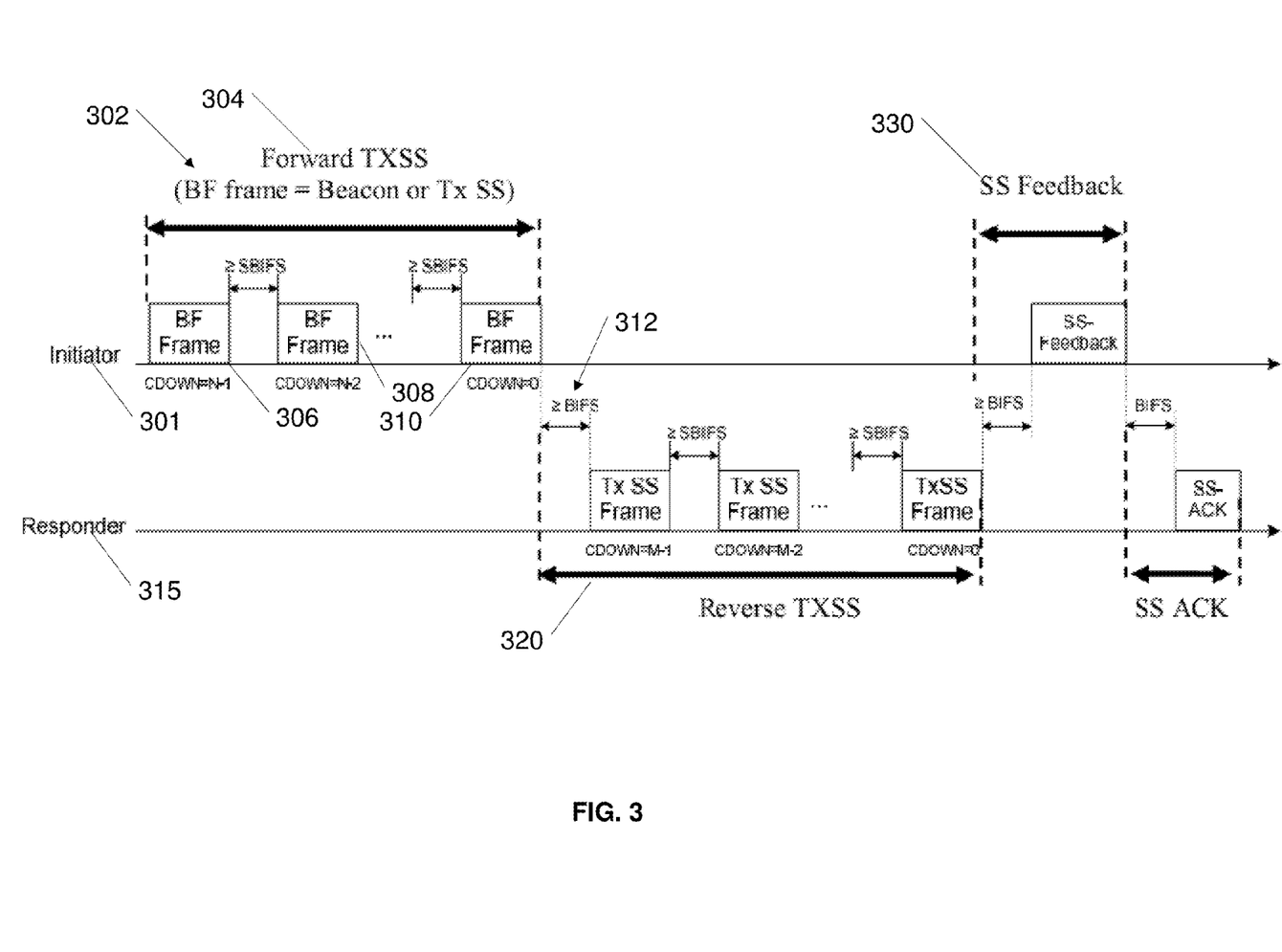
FIG. 3 illustrates what may constitute a typical frame exchange between stations for the beamforming protocol in a conventional system.

FIG. 3 illustrates what may constitute a typical frame exchange 300 for the BF protocol in a conventional system between stations, such as between station 106 and station 120, where BF frames may comprise Transmit Sector Sweep (TxSS) frames, Sector Sweep (SS) frames, beacon frames, SS-Feedback frames, and sector sweep acknowledgement (SS-ACK) frames. SS, TxSS, and beacon frames 302 carry information that allows an initiating station, or initiator 301, to communicate to the receiving station, or responder 315, the time in which the response from the responder 315 is allowed to start. Communicating the allowable start time for the responder 315 may be needed, because the frames transmitted from both the initiator 301 and responder 315 may be transmitted in a sweeping mode through more than one direction available to the initiator 301 or responder 315.

As illustrated in FIG. 1, Forward TXSS (F-TXSS) phase 304 and the Reverse TXSS (R-TXSS) phase 320 may each comprise multiple frame transmissions. Because of the multiple frame transmissions, the responder 315 may generally need to know when F-TXSS phase 304 is complete so that the responder 315 can start R-TXSS phase 320. Similarly, the initiator 301 may generally need to know when the responder 315 completes R-TXSS phase 320, so that the initiator 301 may provide SS feedback 330. Conventionally, the initiator 301 and responder 315 may communicate when the respective phases are to be complete by way of a countdown (CDOWN) field. Basically, the Beacon and TxSS frames may carry a CDOWN value that is decremented after each frame transmission. By decrementing the CDOWN value, the other station may determine when it can initiate its own transmission. In other words, the other station may initiate its transmission after the CDOWN field is expected to reach 0.

For an illustrative example using FIG. 1A and FIG. 2A for reference, station 106 may transmit BF frame 306 in a first direction, such as in the direction of antenna sector 201. BF frame 306 may have a CDOWN value of 11. Station 106 may then transmit BF frame 308, having a decremented CDOWN value of 10, in the direction of antenna sector 202. Station 106 may continue transmit numerous BF frames during F-TXSS phase 304, until transmitting BF frame 310 in the direction of antenna sector 212, with a CDOWN value of 0. Upon recognizing that the CDOWN value has reached 0, station 120 may start R-TXSS phase 320 after the duration of backoff inter-frame space (BIFS) 312.

Stations that only support conventional beamforming approaches, such as the approach illustrated in FIG. 3, may have several limitations. First, conventional systems currently implement beamforming with a separate and independent protocol. In other words, conventional systems implement beamforming using only use specific frames, only during specific periods of time. After two stations complete beamforming, no other frame transmissions between the two stations carry BF-specific information. Saying this in another way, data frames, management frames and most control frames (e.g., RTS, CTS, CF-End, etc.) are generally left unchanged. Hence, conventional systems provide no means for data, management, and other control frames to be sent in a sweeping mode.

Second, the fact that generally only designated frames carry BF information causes significant problems to enable existing 60 GHz specifications to work with other protocols. Notable examples are the WFA peer-to-peer (P2P) and Wi-Fi Protected Setup (WPS) specifications. In these WFA specifications, frame exchanges generally occur before station association, with the frames being primarily management/data frames. However, because the sending of the management and data frames occurs before beaconing and association, a fundamental problem relates to enabling the management and data frames to be sent in an omni-directional mode, including in 60 GHz networks.

As a consequence of frame exchanges generally occurring before station association, a major medium access problem arises, the problem being related to the transmission of control response frames (e.g., ACK, CTS, and Block ACK). According to conventional specifications, a responder transmits a control response frame after a short inter-frame space (SIFS) period after reception of a requesting frame transmitted via unicast.

Referring to FIG. 3 for illustration, assume that responder 315 receives a Probe Response frame from initiator 301, but initiator 301 still has a number of Probe Responses to transmit as part of the sector sweeping process. With conventional methods, responder 315 will send an ACK frame (the control response frame in this example) SIFS time following the reception of the Probe Response. However since initiator 301 is still transmitting the Probe Response, it will not receive the ACK. Transmitting such a frame as the ACK frame, while the intended receiving station is still transmitting frames, is a major problem to the channel access protocol as result of the directional communication in 60 GHz. Accordingly, embodiments may enable native MAC support for beamforming to address these aforementioned issues. In other words, embodiments may implement beamforming in a manner which enables various data frames, management frames, and other control frames to be transmitted in a sweeping mode. Further, embodiments may enable various types of frames to carry beamforming information.

According to numerous embodiments, wireless communication devices, such as stations 106, 120, and 130, may implement beamforming as a native part of the MAC protocol. In other words, embodiments may depart from the teachings of the conventional technology and allow integration of beamforming information in data, management, and control frames. Embodiments may integrate beamforming information in data, management, and control frames using a specific control field. The specific control field may be referred to as a beamforming control field, or alternatively as a beamforming field or mmWave control field. Further, embodiments may also change the channel access rule for response frames, such as ACK, immediate Block ACK, and CTS, in 60 GHz systems. Both the integration of the beamforming information and the changing of the channel access rule for response frames may be illustrated with reference to FIGS. 1A and 4.

Figure 4:
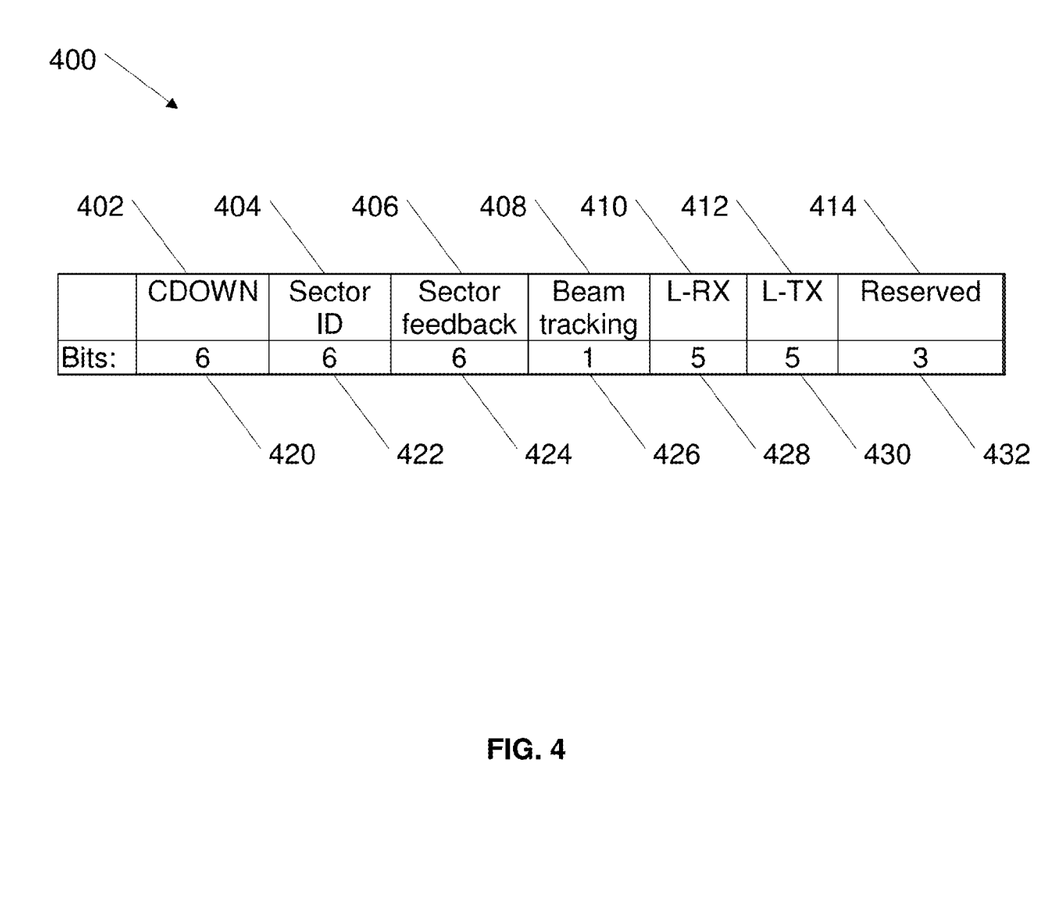
FIG. 4 illustrates one possible structure, or arrangement, of a beamforming field.

In implementing native MAC support for beamforming in data frames, management frames, and control frames, embodiments of 60 GHz networks may employ a mmWave control field, such as beamforming field 400. For the sake of conceptual understanding, and only by way of illustration and not intended as a limitation, beamforming field 400 may be similar in notion to the high throughput (HT) control field of 802.11n. However, the contents, use, and goal of beamforming field 400 may be very different from the HT control field.

FIG. 4 illustrates one possible structure, or arrangement, of a beamforming field. Alternative embodiments may rearrange the subfields of beamforming field 400. Further, alternative embodiments may add additional fields, not include one or more fields, or substitute one or more other fields than the ones shown in FIG. 4. Many embodiments may implement beamforming field 400 in all control, management and extension frame types. In other words, many embodiments may designate that beamforming field 400 always be present in control, management and extension frames. Obviously, alternative embodiments may posit that beamforming field 400, or a variation of the field, not always be present in all control, management, and extension frames. Further, various embodiments may implement beamforming field 400 using 32 bits, as depicted in FIG. 4. Alternative embodiments may use more or fewer bits.

Many embodiments may also enable beamforming field 400 to be present in data frames and management frames. For example, the embodiments may include beamforming field 400 as determined by the state of the Order bit of the Frame Control field, such as when the Order bit is set to one. Because there may be no requirement for backward compatibility with previous or conventional wireless systems which operate exclusively in the 60 GHz band, use of the 802.11n Control wrapper may be unnecessary. Consequently, beamforming field 400 may be present in all frames transmitted in the 60 GHz band, which may provide beamforming information as a native feature in the MAC. Again, alternative embodiments may not necessarily enable beamforming field 400 to be present in data frames and management frames. For example, some embodiments may enable beamforming field 400 to be present in management frames, but not data frames and vice versa Further other embodiments may only enable beamforming field to be present in some, but not all, data frames or management frames.

As described previously in the discussion of FIG. 3, beamforming field 400 may include a CDOWN subfield/field 402. CDOWN field 402 may indicate how many frame transmissions are left until the end of a sweep. The length 420 of CDOWN field 402 may be six bits. One may note that the Duration field in the MAC header, e.g., the 802.11 MAC header, may not be used for communicating how many transmissions are left in a sweep. The Duration field is used to set the transmit opportunity (TXOP), which has a different function than the CDOWN. For example, the CDOWN can finish before the end of a TXOP.

Beamforming field 400 also comprises sector identification (ID) field 404, which is also six bits in length 422. Sector ID field 404 may identify the sector of a transmitting station through which the frame was transmitted. Beamforming field 400 also comprises length of receive training (L-RX) field 410 and length of transmit training (L-TX) field 412, each of which are five bits in length (428, 430). L-RX field 410 and L-TX field 412 may specify the length of the training sequences for receive training and transmit training, respectively.

Beamforming field 400 also comprises sector feedback field 406, which is six bits in length 424. Sector feedback field 406 may carry feedback information of the best sector from one station to the associated peer station. A responder may set sector feedback field 406 to the value of the Sector ID field received in the "best" BF frame from the initiator. For example, stations 120 and 130 may have previously performed beamforming activities and established a directional between each station. Station 130 may comprise a laptop, wherein the user slightly rotates the laptop and causes the directional link between the stations to be severed while station 130 is in the process of transmitting a video data stream. Not having received an ACK or Block ACK from station 120 for the most recent transmission, station 130 may transmit a number of RTS frames in a sector sweeping fashion, such as to each of the antenna sectors illustrated in FIG. 2A. Station 120 may respond by transmitting a number of CTS frames in a sector sweeping fashion, which include the ID number, in sector feedback field 406, of the transmitted sector which station 120 perceived to be the strongest, had the best quality, or had the lowest data error rate. Similarly, station 130, the initiator, may set sector feedback field 406 to the value of the Sector ID field received in the "best" BF frame from station 120, the responder.

Beamforming field 400 also comprises beam tracking field 408. Beam tracking field 408 may comprise a unique field not supported in conventional protocols. Beam tracking may describe a process that stations may employ to continually refine the beams or links during actual data communication. In numerous embodiments, beam tracking may occur after an initial beamforming process has been completed. By including beam tracking field 408 as part of beamforming field 400 (e.g., a mmWave Control field), a station may quickly signal the need to improve the quality of a BF link by changing the value of beam tracking field 408, such as by setting the single bit 426 from zero to one. Beam tracking field 408 may also allow a station that is transmitting ACK frames to signal the need for beam tracking, which would not otherwise be possible with ACK frames of conventional systems, such as systems that operate in accordance with specifications like 802.11.

In the embodiment depicted by FIG. 4, beam tracking field 408 is one bit 426 in length. Alternative embodiments may have a beam tracking field that is longer. For example, an alternative embodiment may be three bits in length. When a station transmits a value of "000", the station may be indicating that the BF link quality is of sufficient strength or quality and does not need to be adjusted. However, if the station detects that link quality is insufficient, the station may set the beam tracking value to a value which corresponds to the amount of the degradation. As a specific example with reference to FIG. 2A, if the station detects a 5% degradation in the transmitted signal, the station may insert "010" in beam tracking field 408 of a frame. Upon receiving the frame with the beam tracking value equal to "010", the receiving station may perform a relatively small sector sweep. For example, the receiving station may have established a BF link with the peer station using antenna sector 205. Since the value of beam tracking field 408 is relatively small, the receiving station may only sweep through frames 204, 205, and 206. Contrastingly, if the station were to have detected 20% degradation, the station may have instead inserted a value of "100" in beam tracking field 408, which would have in turn enabled the receiving station to sweep a larger number of sectors for the response.

Another aspect of beamforming field 400 worth emphasizing is how the field may enable devices that support various 60 GHz specifications to more efficiently support other technologies, such as WFA P2P and WPS. Probe Request/Response frames are widely used in many 60 GHz specifications as a means for device discovery and are transmitted in omni mode. In 60 GHz systems, the Probe Request/Response frame may be transmitted with beamforming field 400 to allow or enable the responder to determine the best transmit sector, via sector ID field 404, of the initiator when the responder receives the Probe Request. Similarly, beamforming field 400 may allow the initiator to detect the best transmit sector of the responder when it receives the Probe Response.

For example, the responder may use sector ID field 404 to provide feedback of the best sector to the initiator when the responder transmits the Probe Response frame. Upon reception of the Probe Response with the value in sector ID field 404, the initiator may send back an ACK frame to the responder. In the ACK frame, the initiator may also send the best sector feedback to the responder through Sector feedback field 404. After such an exchange of feedback between the responder and the initiator, all other frames as part of the WFA P2P and WPS specs can use the best sector information to transmit a single and directed frame to the destination device. In other words, there may be no more need for omni transmission, which may enable the protocol to be significantly more efficient.

Alternative embodiments may perform beamforming before transmission of Probe Request/Response frames. However, completing beamforming before transmitting the Probe Request/Response frame may have the problem that a device may potentially need to complete beamforming with several other devices, because the Probe Request is a broadcast frame. Such operation may be undesirable, as the basic purpose may simply be device discovery. Additional undesirable effects may stem from other reasons, such as excessive power consumption. Other alternative embodiments may send all frames in omni sweeping mode. Doing so, however, may clearly be very inefficient, because doing so may require all frames to always be transmitted in omni sweeping mode.

As described above, numerous embodiments may include a beamforming field (mmWave Control field) in every control frame. Additionally, many embodiments may also include beamforming fields in management frames and data frames. Including beamforming fields in management frames and data frames may allow changes to the access rules of the control response frames for various specifications for the 60 GHz band. For example, inclusion of the beamforming fields may allow changes to the transmissions of ACK frames, CTS frames, and Immediate Block ACK (Imm-BA) frames.

As for the changing of the channel access rule for response frames, embodiments may use the data values provided in the fields of beamforming field 400. For example, instead of control response frames being transmitted SIFS after the reception of a requesting frame (data, management, RTS), an embodiment may transmit a control response frame SIFS after the end of the sweep of the requesting frame. A station may estimate the end of the sweep by examining or evaluating CDOWN field 402 of beamforming field 400, as the field will be present in the transmitted frame(s). For example, if a station receives a frame, whether the frame be a data frame, a management frame, an extension frame, or a control frame, with CDOWN=3, the station may wait for a period of time equivalent to another 3 transmissions of the same frame plus SIFS before the station transmits the control response frames.

Returning back to the problem described earlier, assume that responder 315 receives a Probe Response frame from initiator 301, but initiator 301 still has a number of Probe Responses to transmit as part of the sector sweeping process. Responder 315 may need to send the ACK frame following the reception of the Probe Response. Because initiator 301 is still transmitting the Probe Response, initiator 301 may include different values in CDOWN field 402, decrementing the value for each sequentially transmitted Probe Response frame. Responder 315 may determine that initiator 301 is in the process of a sweep by examining the value of CDOWN field 402. Consequently, responder 315 may delay transmitting an ACK frame until after the sweep period, which may be determined by the value of CDOWN field 402.

Figure 5A:
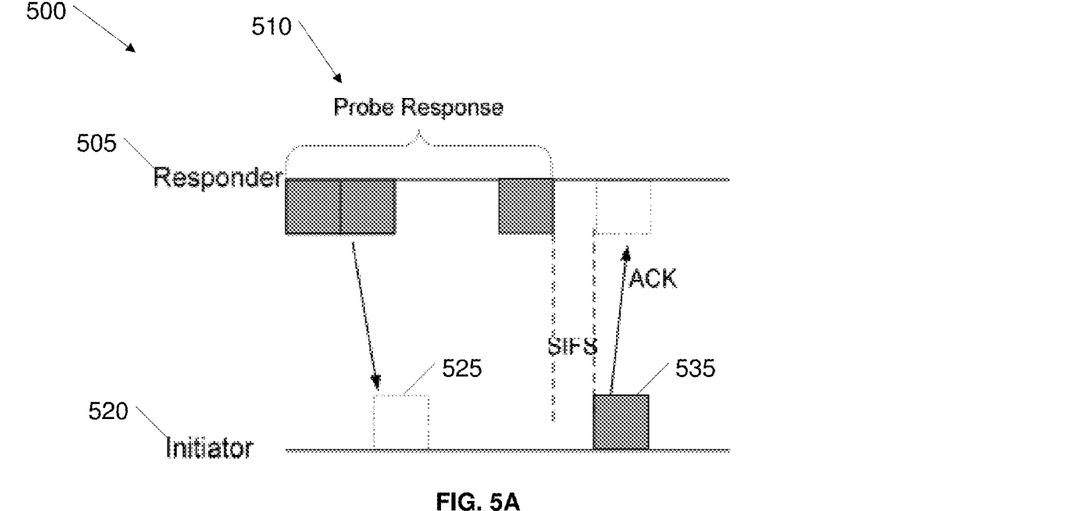
FIG. 5A illustrates one operational example of how an embodiment may transmit a control response frame SIFS after the end of the sweep of Probe Response frames.

FIG. 5A illustrates one operational example of how an embodiment may transmit a control response frame SIFS after the end of the sweep of Probe Response frames. For the sake of this illustration, responder 505 may not know the location of initiator 520, but initiator 520 may already know the location or transmitting direction for responder 505. As FIG. 5A illustrates, a responder 505 may be in the process of transmitting a series of Probe Response frames 510 as part of a sector sweep. In this scenario, the initiator 520 may receive one of the transmitted frames (525) and transmit the ACK frame 535 only once through the best sector, because the best sector ID number was provided by responder 505 through the Sector ID field of the beamforming field in the received Probe Response frame 525.

Figure 5B:
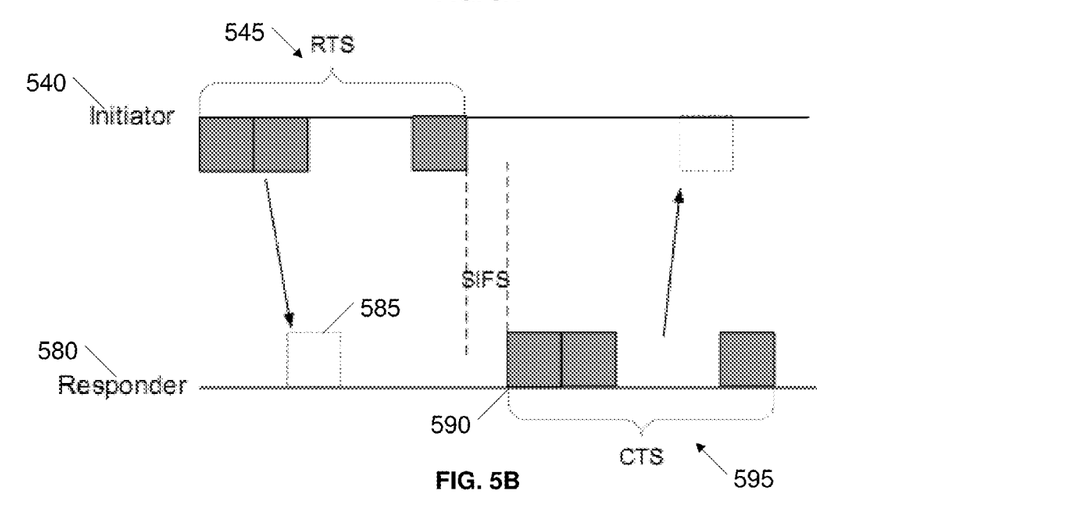
FIG. 5B illustrates another operation example when the transmission of the control response frames are Request To Send / Clear To Send (RTS/CTS) frames.

FIG. 5B illustrates another operation example when the transmission of the control response frames are RTS/CTS frames. In this case, it is assumed that neither responder 580 nor initiator 540 has knowledge of the best sector information for the peer station. Consequently, each station may transmit the control frames in sweeping mode (545 and 595). However, since responder 580 receives the CDOWN value in the CDOWN field from the RTS frame received from the initiator (585), responder 580 may be able to determine the instant in time (590) to initiate its CTS transmissions (595).

Figure 1B:
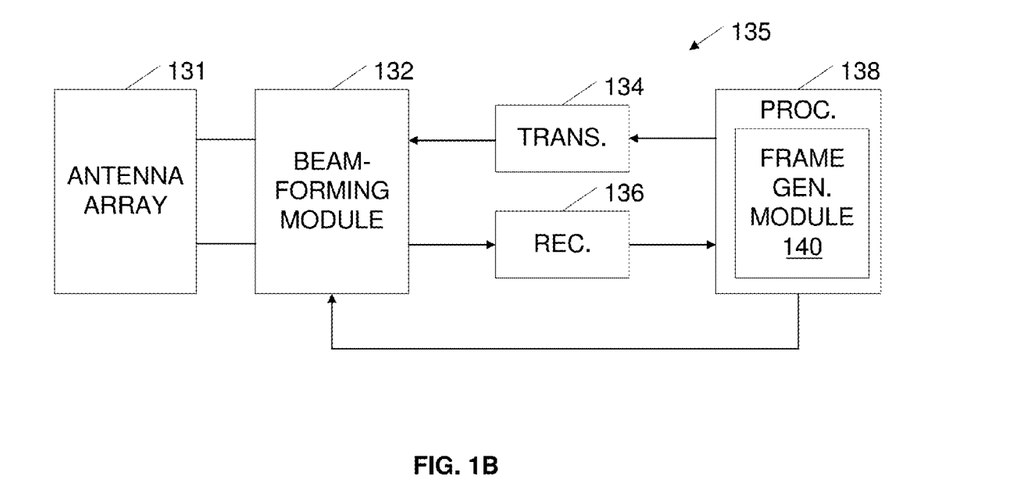
FIG. 1B shows a block diagram of an apparatus that may enable native MAC support of beamforming.

FIG. 1B is a block diagram of an apparatus 135 in accordance with some embodiments. For example, apparatus 135 may comprise a station, or at least part of a station, such as stations 106, 120, or 130 depicted in FIG. 1A. Apparatus 135 may be configured to transmit and receive frames of information in the 60 GHz band in many embodiments. However, in alternative embodiments, apparatus 135 may operate in bands other than the 60 GHz band. Apparatus 135 may include, among other things, an antenna array 131, beamforming module 132, transmitter 134, receiver 136, and processing circuitry 138. As shown, processing circuitry 138 may comprise a frame generation module 140.

Antenna array 131 may include a plurality of antenna elements and may be configured to communicate in a plurality of antenna sectors, such as antenna sectors 201-212 in FIG. 2A. In some alternate embodiments, apparatus 135 may utilize a switched-beam antenna, although the scope of the embodiments is not limited in this respect. In some alternate embodiments, apparatus 135 may utilize a single antenna element, although the scope of the embodiments is not limited in this respect.

In accordance with some embodiments, beamforming module 132 may configure antenna array 131 to transmit an SS frame (e.g., a control/management/data frame) separately in each of the antenna sectors 201-212. For example, beamforming module 132 may configure antenna array 131 to transmit Probe Response frames 510, depicted in FIG. 5A. Beamforming module 132 may also configure antenna array 131 to receive reverse or "incoming" sector-sweep frames, such as CTS frames 595 depicted in FIG. 5B.

Frame generation module 140 may work in conjunction with processing circuitry 138 and assemble data values for the beamforming field 147. For example, apparatus 135 may comprise an element or a device in station 120, wherein station 120 comprises a desktop computer transmitting information to station 130, comprising a wireless printer with wireless communications capabilities. Processing circuitry 138 may receive information to be transmitted to station 130, such as pages of a word processing document. Processing circuitry 138 may provide the data to frame generation module 140 which forms or generates the various fields of the data frames 141 being transmitted to station 130, comprising the frame control field 142, source and destination addresses 144, sequence control field 145, data fields 146, and beamforming field 147. Periodically, when receiver 136 and processing circuitry 138 detect a degradation in the feedback from station 130, processing circuitry 138 and frame generation module 140 may set the beam tracking bit to one in one or more frames being transmitted and thereby communicate the need to adjust one or more parameters of the beamforming.

Apparatus 135 may include other circuitry for communicating millimeter-wave wireless communication signals, including 60 GHz wireless technologies. In some embodiments, apparatus 135 can be used to provide a flexible interface that can be efficiently embedded into home media gateways, cell phones, smart phones, flat panel televisions (TVs), set-top boxes, Blu-ray players, digital cameras, personal computers (PCs), laptops, netbooks, and many other multimedia and communication devices. Although apparatus 135 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of apparatus 135 may refer to one or more processes operating on one or more processing elements.

Figure 1C:
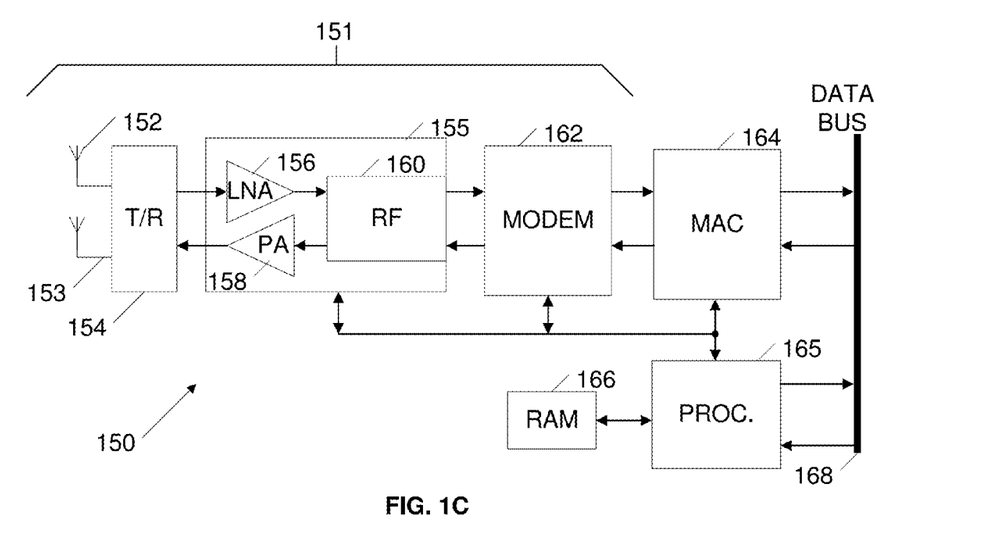
FIG. 1C shows a block diagram of a wireless communication system that may enable native MAC support of beamforming.

FIG. 1C shows a wireless communication system 150 that may enable native MAC support for beamforming. For example, wireless communication system 150 may comprise a more specific embodiment of apparatus 135, which again may comprise station 106, 120, or 130, depicted in FIG. 1A. In some embodiments wireless communication system 150 may comprise part of a computer system, such as wireless access card of a notebook or a desktop computer. In other embodiments, wireless communication system 150 may comprise a networking device, such as a router that has an integrated access point. In even further embodiments wireless communication system 150 may comprise part of a different type of computing apparatus, such as a palmtop computer, a personal digital assistant (PDA), or a mobile computing device, as examples.

Wireless communication system 150 includes a physical layer interface (PHY) 151 that includes multiple antennas 152 and 153 capable of performing beamforming activities in the 60 GHz band, a transmit/receive (T/R) switch 154 for half-duplex operation, and a wireless transceiver 155 that includes a low-noise amplifier (LNA) 156, a power amplifier (PA) 158, and other radio frequency (RF) transceiver components 160 not shown. The physical layer also includes a data modem 162. Wireless communication system 150 further includes a media access controller 164 for layer-2 processing. A computer system data bus 168 is accommodated. Interfaces may be included e.g., one or more interfaces that conform to industry-standard Personal Computer Memory Card International Association (PCMCIA), peripheral component interconnect (PCI), universal serial bus (USB), and so forth.

The embodiment of FIG. 1B comprises a processor 165. Some embodiments may not specifically comprise a separate processor 165. For example, in one or more embodiments, the host processor function may be incorporated into media access controller 164. A random access memory (RAM) 166 is included for data buffering and program storage. RAM 166 may be directly coupled to processor 165, to media access controller 164, or to both.

In addition to the radio data between modem 162, transceiver 155, and media access controller 164, control information such as gain settings for the radio receiver from an automatic gain control module in modem 162, and other data, may be communicated between processor 165 (if included), media access controller 164, modem 162, and wireless transceiver 155.

Wireless communication system 150 may be compatible with various IEEE-802.11 standards for WLAN applications. RF transceiver 160 and modem 162 may constitute a wireless engine for OSI Layer-1 physical layer (PHY) functionality in broadband wireless LANs. Media access controller 164 may be IEEE-802.11-compliant for layer-2 processing. Wireless communication system 150 may enable native MAC support for beamforming via the PHY 151 and media access controller 164. For example, media access controller 164 may generate or assemble the values of the beamforming field and include the beamforming field in data, control, and management frames to be transmitted by wireless communication system 150. Further, media access controller 164 may disassemble or interpret frames, received by wireless communication system 150, which include beamforming fields. Further, PHY 151 may be configured to respond to control signals from processor 165 to manipulate antenna elements of antennas 152 and 153, so as to perform sector sweeping and other beamforming activities, such as adjusting gain and phase for the transmitted signals from antennas 152 and 153.

Many alternative embodiments of wireless communication system 150 may comprise additional components, while other alternative embodiments of wireless communication system 150 may comprise fewer components. For example, many embodiments of wireless communication system 150 may comprise a memory controller hub (MCH) and an I/O controller hub (ICH). In some embodiments, processor 165 may have one or more cores coupled with cache and one or more memory elements. The types of memory elements may vary in different embodiments. In some embodiments, the memory may comprise volatile memory elements, such as two 1-gigabyte (GB) dynamic random access memory (DRAM) sticks. In other embodiments, the memory may comprise nonvolatile memory. For example in some embodiments the memory may comprise a flash memory module, such as a 4 GB flash memory card. Such memory may enable wireless communication device 150 to be updated, such as by a flash upgrade procedure. Alternatively, RAM 166 may be used to buffer data received or data to be transmitted.

In some embodiments, wireless communication system 150 may interact with external peripheral devices, such as keyboards, scanners, and data storage devices. Various embodiments of wireless communication system 150 may present information to a user via a display device. Various embodiments of wireless communication system 150 may also interact with Advanced Technology Attachment (ATA) devices, such as ATA hard drives, compact disc (CD) drives, and digital versatile disc (DVD) drives.

In some embodiments, configuration software and/or the operating system of wireless communication system 150 may have a selectable parameter which enables or disables the native MAC support for beamforming based on system operating conditions, or hardware compatibility, as examples. For example, when installing a communication card comprising the elements of wireless communication system 150 into a desktop computer, a user may execute configuration software which installs drivers and other low-level software that enables the communication card to interact with the operating system and/or hardware of the desktop computer. During execution of the configuration software, the use may enable an option which causes wireless communication system 150 to disable the native MAC beamforming support, or enable the support but disable some other optional feature which may interfere with the beamforming support. Depending on the embodiment, the configuration software may permit the user do completely disable the native MAC beamforming support feature, which may be necessary if wireless communication system 150 were to have an incompatibility issue with one or more devices in the local network.

As noted, system 150 includes multiple antennas 152 and 153 capable of performing beamforming. In alternative embodiments, antennas 152 and 153 may comprise separate antennas for separate bands. For example, apparatus 135 may represent station 106 and/or station 130. Station 106 may have multiple antenna devices, such as antenna 107 and antenna 108. As described previously, antenna 107 may be configured to operate in the 60 GHz band. Antenna 108 may be configured to operate in a different band, such as one of the bands from 2-7 GHz. For example, antenna 107 may enable station 106 to communicate with station 120 in the 60 GHz band, yet utilize antenna 108 to communicate with antenna 128 of station 130 using a band in the 2-7 GHz range when operating in a backward-compatibility, or "legacy" mode.

Figure 6:
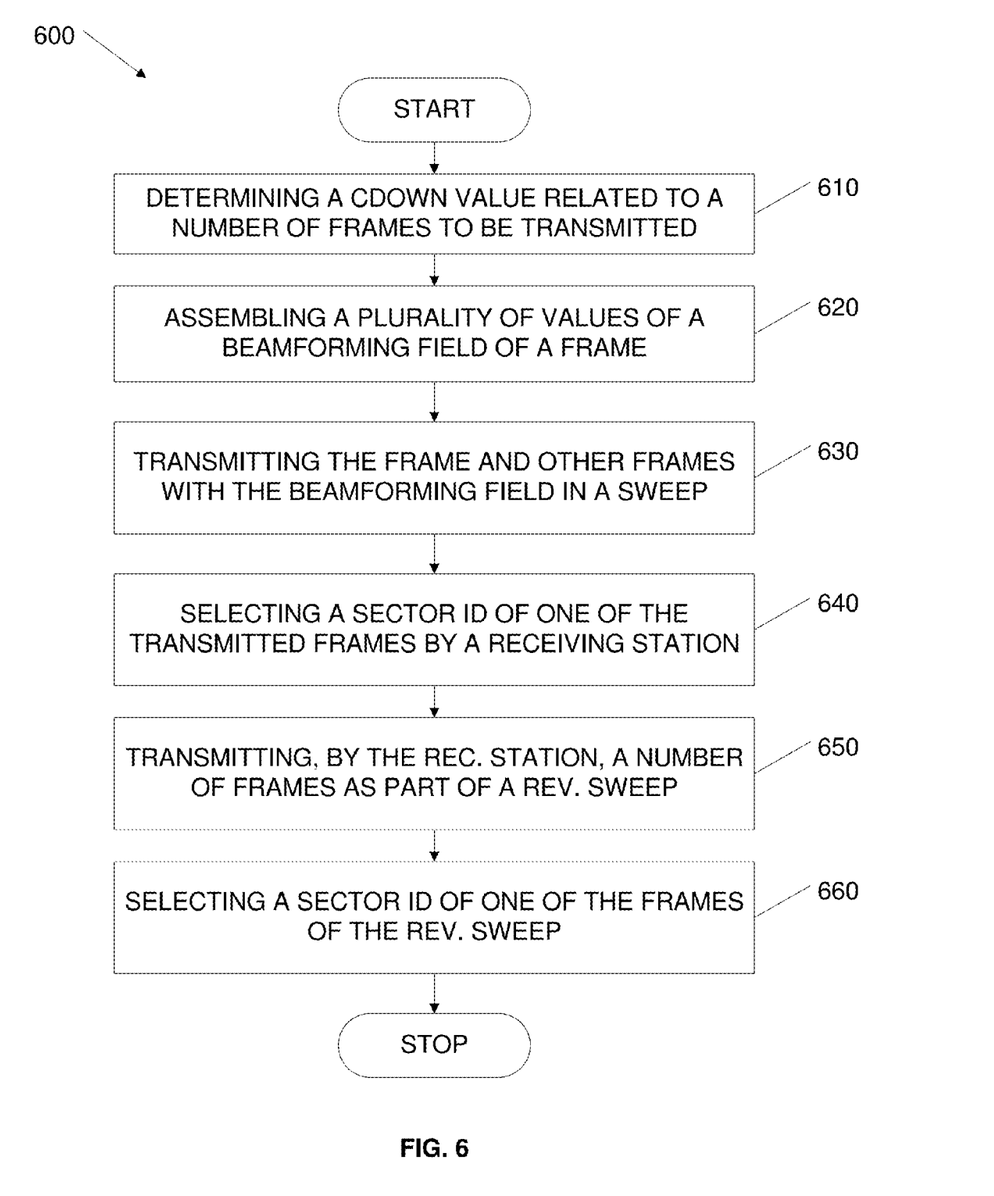
FIG. 6 illustrates a method for providing native MAC support of beamforming.

FIG. 6 depicts a flowchart 600 which illustrates a method for providing native MAC support of beamforming. Flowchart 600 begins with determining a countdown value related to a number of frames to be transmitted (element 610). For example, station 120 of FIG. 1A may need to transmit twelve RTS frames 545 to station 130 as part of a sector sweep of 12 different sectors, similar to the antenna sectors of FIG. 2A.

Upon determining that the countdown value is equal to 11 (element 610), which represents twelve frames including a CDOWN value of 0, an embodiment according to flowchart 600 may continue by assembling a plurality of values of the beamforming field of a frame (element 620). Continuing with the previous example, station 120 may employ a frame generation module to assemble the countdown value, a sector ID value, a sector feedback value a beam tracking value, and other values for a beamforming field. The frame generation module may assemble these values into a first RTS frame of an number of frames to be transmitted as part of a forward transmission sector sweep, such as the RTS frames 545 shown in FIG. 5B. Once station 120 transmits the number of RTS frames 545 in the sweep (element 630), station 130 may select a sector identification number (element 640) of one of the transmitted frames, such as the received RTS frame 585 in FIG. 5B. In response to the forward sweep by station 120, station 130 may transmit a number of frames as part of a reverse sweep (element 650), such as the number of CTS frames 595 shown in FIG. 5B.

Station 120 may receive one or more of the frames in the reverse sweep (element 650, element 595). Based on the best quality of one of the frames received, station 120 may select a sector ID of the frame (element 660). For example, station 130 may have transmitted twelve CTS frames, with each frame containing a unique sector ID number based on the antenna sector in which the frame was transmitted from station 130. Station 120 may receive at least two of the frames and select the sector ID number of the frame with the best quality and communicate the sector ID number in a subsequent frame transmitted back to station 130.

As noted earlier in the discussions related to FIG. 1B and FIG. 1C, one or more portions of some embodiments may be implemented as a program product stored in a tangible medium for use with a process to perform operations for processes, such as the processes described in conjunction with FIG. 6. The program(s) of the program product defines functions of the embodiments (including the methods described herein) and may be contained on a variety of data-bearing media. Illustrative data-bearing media include, but are not limited to: (i) information permanently stored on non-writable storage media (e.g., read-only memory devices within a station); and (ii) alterable information stored on writable storage media (e.g., flash memory). Such data-bearing media, when carrying computer-readable instructions that direct the functions of devices or systems, represent elements of some embodiments of the present invention.

In general, the routines executed to implement the embodiments, may be part of an operating system or a specific application, component, program, module, object, or sequence of instructions. The computer program of an embodiment may be comprised of a multitude of instructions that will be translated by a computer into a machine-readable format and hence executable instructions. Also, programs may be comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus a specific embodiment should not be limited to use solely in any specific application identified and/or implied by such nomenclature.

It will be apparent to those skilled in the art having the benefit of this disclosure that the embodiments herein contemplate systems, apparatuses, and methods for enabling native MAC support for beamforming. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:
1. An apparatus, comprising:
a transmitter coupled with a medium access control (MAC) and to couple to an antenna array, to sequentially transmit a sweep of multiple request to send (RTS) control frames in a plurality of sectors about a periphery of the apparatus, wherein each RTS control frame is transmitted in a different sector of the plurality of sectors and comprises a sector identification (ID) value to identify the different sector, wherein a countdown value in each RTS control frame sequentially transmitted is decremented to indicate how many frame transmissions are left to selectively transmit in the plurality of sectors; and
a frame generation module of the MAC communicatively coupled to the transmitter, the frame generation module to generate the MAC RTS control frames, wherein further each of the MAC RTS control frames comprises a beamforming field comprising beamforming values which enable the apparatus to perform beamforming activities, wherein the beamforming values comprise the countdown value, the sector ID value, and a sector feedback value.

2. The apparatus of claim 1, wherein the transmitter transmits the MAC control frames in a 60 gigahertz (GHz) band.

3. The apparatus of claim 2, further comprising a receiver coupled to the antenna array, wherein the frame generation module is configured to generate an acknowledgment frame comprising one value of a plurality of sector identification values transmitted as part of an associated plurality of probe responses, the associated plurality of probe responses constituting a sector sweep for a wireless communication device.

4. The apparatus of claim 1, wherein the frame control module is communicatively coupled with a receiver to respond to a sector sweep of MAC RTS control frames from another device, the frame control module to transmit a clear to send (CTS) control frame in response to the sector sweep of MAC RTS control frames a short interframe space (SIFS) after an end of the sector sweep of MAC RTS control frames.

5. A method, comprising:
sequentially transmitting, by a medium access control (MAC) via a transmitter coupled to an antenna array, a sweep of multiple MAC request to send (RTS) control frames in a plurality of sectors about a periphery of the antenna array, wherein each RTS control frame is transmitted in a different sector of the plurality of sectors and comprises a sector identification (ID) value to identify the different sector, wherein a countdown value in each RTS control frame sequentially transmitted is decremented to indicate how many frame transmissions are left to selectively transmit in the plurality of sectors; and
generating, by the MAC, the MAC RTS control frames via a frame generation module of the MAC communicatively coupled to the transmitter, wherein further each of the MAC RTS control frames comprises a beamforming field comprising beamforming values which enable beamforming activities, wherein the beamforming values comprise the countdown value, the sector ID value, and a sector feedback value.

6. The method of claim 5, wherein selectively transmitting comprises transmitting, via the transmitter, the MAC control frames in a 60 gigahertz (GHz) band.

7. The method of claim 6, further comprising generating, by the frame generation module, an acknowledgment frame comprising one value of a plurality of sector identification values transmitted as part of an associated plurality of probe responses, the associated plurality of probe responses constituting a sector sweep for a wireless communication device.

8. The method of claim 5, further comprising responding, by the MAC, to a sector sweep of MAC RTS control frames from another device, the MAC to transmit a clear to send (CTS) control frame in response to the sector sweep of MAC RTS control frames a short interframe space (SIFS) after an end of the sector sweep of MAC RTS control frames.

9. A system, comprising:
an antenna array;
a transmitter coupled to the antenna array and coupled with a medium access control (MAC), wherein the antenna array is configured to sequentially transmit a sweep of multiple MAC request to send (RTS) control frames in a plurality of sectors about a periphery of the antenna array, wherein each RTS control frame is transmitted in a different sector of the plurality of sectors and comprises a sector identification (ID) value to identify the different sector, wherein a countdown value in each RTS control frame sequentially transmitted is decremented to indicate how many frame transmissions are left to selectively transmit in the plurality of sectors; and
a frame generation module of the MAC communicatively coupled to the transmitter, the frame generation module to generate the MAC RTS control frames, wherein further each of the MAC RTS control frames comprises a beamforming field comprising beamforming values which enable the system to perform beamforming activities, wherein the beamforming values comprise the countdown value, the sector ID value, and a sector feedback value.

10. The system of claim 9, wherein the transmitter transmits the MAC control frames in a 60 gigahertz (GHz) band.

11. The system of claim 10, further comprising a receiver coupled to the antenna array, wherein the frame generation module is configured to generate an acknowledgment frame comprising one value of a plurality of sector identification values transmitted as part of an associated plurality of probe responses, the associated plurality of probe responses constituting a sector sweep for a wireless communication device.

12. The system of claim 9, wherein the frame generation module is communicatively coupled with a receiver to respond to a sector sweep of MAC RTS control frames from another device, the frame generation module to transmit a clear to send (CTS) control frame in response to the sector sweep of MAC RTS control frames a short interframe space (SIFS) after an end of the sector sweep of MAC RTS control frames.

13. A program product comprising:
a non-transitory medium containing instructions to enable native medium access control support of beamforming, wherein execution of the instructions cause a machine to perform operations, the operations comprising:
sequentially transmitting, by a medium access control (MAC) via a transmitter coupled to an antenna array, a sweep of multiple MAC request to send (RTS) control frames in a plurality of sectors about a periphery of the machine, wherein each RTS control frame is transmitted in a different sector of the plurality of sectors and comprises a sector identification (ID) value to identify the different sector, wherein a countdown value in each RTS control frame sequentially transmitted is decremented to indicate how many frame transmissions are left to selectively transmit in the plurality of sectors; and
generating, by the MAC, the MAC RTS control frames via a frame generation module of the MAC communicatively coupled to the transmitter, wherein further each of the MAC RTS control frames comprises a beamforming field comprising beamforming values which enable beamforming activities, wherein the beamforming values comprise the countdown value, the sector ID value, and a sector feedback value.

14. The program product of claim 13, wherein selectively transmitting comprises transmitting, via the transmitter, the MAC control frames in a 60 gigahertz (GHz) band.

15. The program product of claim 14, further comprising generating, by the frame generation module, an acknowledgment frame comprising one value of a plurality of sector identification values transmitted as part of an associated plurality of probe responses, the associated plurality of probe responses constituting a sector sweep for a wireless communication device.

16. The program product of claim 13, further comprising responding, by the MAC, to a sector sweep of MAC RTS control frames from another device, the MAC to transmit a clear to send (CTS) control frame in response to the sector sweep of MAC RTS control frames a short interframe space (SIFS) after an end of the sector sweep of MAC RTS control frames.

\* \* \* \* \*